No. 702,276. Patented June 10, 1902.
D. A. BAKER.
CLOSING AND LOCKING DEVICE FOR DENTAL FLASKS.
(Application filed July 31, 1901.)
(No Model.)
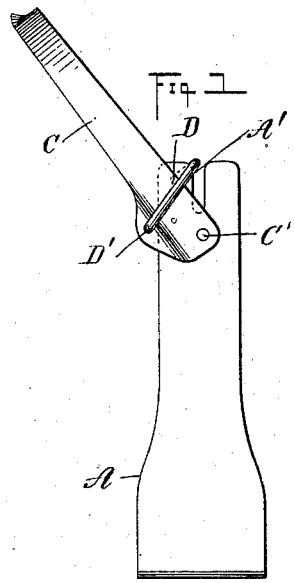
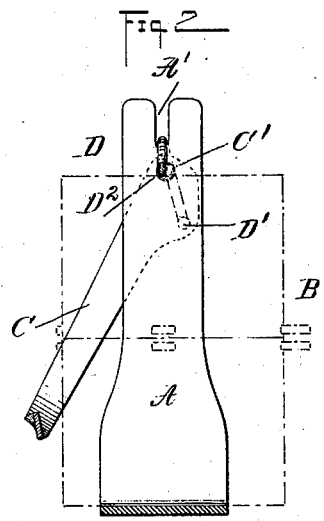
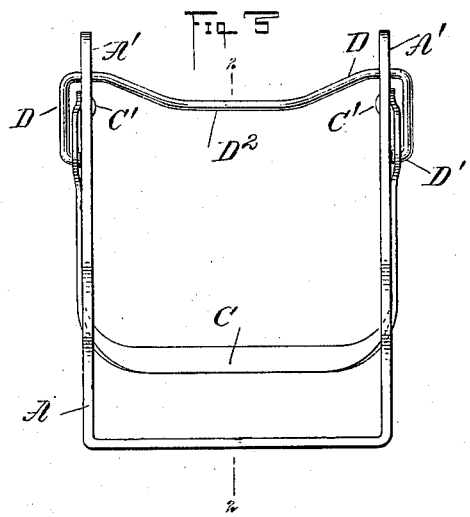
WITNESSES:
INVENTOR
Daniel A. Baker
BY
ATTORNEYS

UNITED STATES PATENT OFFICE.

DANIEL ALMER BAKER, OF SCHENECTADY, NEW YORK.

CLOSING AND LOCKING DEVICE FOR DENTAL FLASKS.

SPECIFICATION forming part of Letters Patent No. 702,276, dated June 10, 1902.

Application filed July 31, 1901. Serial No. 70,356. (No model.)

*To all whom it may concern:*

Be it known that I, DANIEL ALMER BAKER, a citizen of the United States, and a resident of Schenectady, in the county of Schenectady and State of New York, have invented certain new and useful Improvements in Closing and Locking Devices for Dental Flasks, of which the following is a full, clear, and exact description.

The invention relates to devices for closing and locking sectional casting-flasks used for dental and other purposes; and its object is to provide a new and improved closing and locking device which is simple and durable in construction, readily applied, and arranged to securely close the sections of the flask and to lock the same together without requiring much exertion on the part of the operator.

The invention consists of novel features and parts and combinations of the same, as will be fully described hereinafter and then pointed out in the claims.

A practical embodiment of the invention is represented in the accompanying drawings, forming a part of this specification, in which similar characters of reference indicate corresponding parts in all the views.

Figure 1 is a side elevation of the improvement in an open position. Fig. 2 is a sectional side elevation of the same applied and in a closed position, the section being on the line 2 2 in Fig. 3; and Fig. 3 is a front view of the improvement.

The improved device consists, essentially, of a stirrup A, in which is adapted to be set a sectional flask B, and on the side arms of said stirrup A are pivoted at C' the ends of a U-shaped lever C, carrying pivots D' of a bail D, extending transversely and having its middle portion mounted to slide vertically in guideways A', formed on the upper ends of the side arms of the stirrup A. The bail D is preferably bent downward at $D^2$ at its middle portion, as is plainly indicated in Fig. 3, so as to readily engage the top of the uppermost flask-section when the flask is in position in the stirrup A, as illustrated in Fig. 2. The bail D is a tempered-steel spring which bears on the flask, closing the latter without undue pressure.

Ordinarily in the practice of dentistry it is common, after making the blocks of teeth and the model, the parts are placed in a press and set in hot water, after which the flask is gradually screwed down, which requires time. As the water in an open boiler is not hot enough to soften the rubber in the flask and to thereby render the closing easy, the flask frequently cannot be closed without the application of undue pressure, which sometimes results in spreading joints and cracking or breaking the blocks and the model, either or both. The tempered spring-bail D is therefore an important element of my flask closing and locking device, because it permits pressure to be exerted in a yielding manner upon the flask.

My device closes after being placed in the vulcanizer, as the rubber or other material becomes much softer in a closed boiler, such closing taking place without undue pressure, thus affording the advantage of a self-closing flask-press.

The device is used as follows: When the lever C is in an uppermost position, as illustrated in Fig. 1, the device is open and the sectional flask B can be readily inserted in the stirrup A, and after this has been done the operator swings the lever C downward, so that the middle portion of the bail D moves vertically downward in the guideways A' and engages with the portion $D^2$ the top of the uppermost flask-section, so as to firmly press the sections together and close the same. The lever C is swung downward until the middle portion thereof is close to or at the side of the flask B, the pivots D' then standing at the rear of a vertical plane passing through the fulcrum C' and the guideways A' to lock the several parts of the device securely in position—that is, to prevent the lever C from accidentally swinging upward into an open position. When it is desired to unlock the flask and remove the same from the device, then the operator takes hold of the lever C and swings the same upward back into the open position (shown in Fig. 1) to move the bail D out of engagement with the top of the upper flask-section. The flask can then be removed from the stirrup.

It will be seen that the device is very simple and durable in construction, allows of readily applying it to a flask, and securely holds the flask-sections in a closed position to allow of making a perfect cast.

Having thus fully described my invention, I claim as new and desire to secure by Letters Patent—

1. A closing and locking device, comprising a stirrup, a lever fulcrumed thereon, and a bail pivotally connected with said lever and movable in a guideway on the stirrup, as set forth.

2. A closing and locking device, comprising a stirrup, a lever fulcrumed thereon, and a bail pivotally connected with said lever and movable in a guideway on the stirrup, said bail having a bent middle portion, as set forth.

3. A closing and locking device, comprising a stirrup having guideways in its side arms, a U-shaped lever fulcrumed on the side arms of the stirrup, and a bail pivotally connected with said lever and mounted to slide in said guideways, as set forth.

4. A closing and locking device, comprising a stirrup having guideways in its side arms, a U-shaped lever fulcrumed on the side arms of the stirrup, and a bail pivotally connected with said lever and mounted to slide in said guideways, said bail having its middle portion bent downward, as set forth.

5. In a flask closing and locking device, the combination with a flask-receiving member, of a yieldable pressure member, and means for forcibly moving said pressure member.

6. In a flask closing and locking device, the combination with a flask-receiving member, of an elastic pressure member movable relative to the receiving member, and means for imparting relative movement to said members.

7. In a flask closing and locking device, the combination with a flask-receiving member, of a yieldable pressure-bail movable relative to said receiving member, and a lever for adjusting said bail.

In testimony whereof I have signed my name to this specification in the presence of two subscribing witnesses.

DANIEL ALMER BAKER.

Witnesses:
CHAS. HAZARD,
MORRIS FULLER.